United States Patent

Bella et al.

Patent Number: 5,621,755
Date of Patent: Apr. 15, 1997

[54] CMOS TECHNOLOGY HIGH SPEED DIGITAL SIGNAL TRANSCEIVER

[75] Inventors: Valter Bella, Turin; Andrea Finotello, Settimo Torinese; Danilo Galgani; Marco Gandini, both of Turin, all of Italy

[73] Assignee: CSELT - Centro Studi e Laboratori Telecomunicazioni S.p.A., Turin, Italy

[21] Appl. No.: 330,914

[22] Filed: Oct. 28, 1994

[30] Foreign Application Priority Data

Dec. 16, 1993 [IT] Italy ................... TO93A0955

[51] Int. Cl.$^6$ ................... H04B 1/38; H04L 5/16
[52] U.S. Cl. ................... 375/219; 375/376; 327/159; 331/11
[58] Field of Search ................... 375/219, 327, 375/375, 376; 327/147, 150, 156, 159; 331/1 R, 10, 11, 17, 25, 32, 1 A

[56] References Cited

U.S. PATENT DOCUMENTS 4,298,986  11/1981  Hughes ................... 375/375
5,015,970  5/1991   Williams et al. .
5,487,093  1/1996   Adresen et al. ................... 375/376

FOREIGN PATENT DOCUMENTS 910342783  9/1993  Japan .

OTHER PUBLICATIONS

GEC Plessey (Semiconductors), SP9970 C HG, 4 pages.
Barry L. Thompson, "A BICMOS Receive/Transmit PLL Pair for Serial Data Communication" 1992 IEEE, 5 pages.

*Primary Examiner*—Stephen Chin
*Assistant Examiner*—Don N. Vo
*Attorney, Agent, or Firm*—Herbert Dubno

[57] ABSTRACT

A high speed digital signal transceiver in CMOS technology, in which the receiver has a clock signal extraction circuit, which is capable of self-aligning on incoming data with no spurious locks. Utilizing the PLL technique, the circuit generates a clock signal locked to the incoming signal utilizing a local oscillator, voltage-controlled by two feedback loops, a main one for frequency and phase corrections and a secondary one for phase correction. Moreover, original circuit solutions for the phase detectors and the low-pass filters are also envisaged.

2 Claims, 4 Drawing Sheets

1

CMOS TECHNOLOGY HIGH SPEED DIGITAL SIGNAL TRANSCEIVER

FIELD OF THE INVENTION

The present invention relates to devices for electronic systems in which digital signals have to be exchanged between equipment located in places that are separated by some distance and, more particularly to a high-speed, CMOS, digital signal transceiver, which can be realized as an integrated circuit on a single chip.

BACKGROUND OF THE INVENTION

It is well known that when digital signals in parallel form have to be transmitted at a certain distance, it is preferable to convert them into serial form so as to be able to utilize a single transmission line, instead of as many lines as are the bits of the parallel signal, for instance eight. The signal to be transmitted must furthermore be appropriately coded in order to minimize its sensitivity to any interference which may have been collected by the transmission line and to enable the receiving apparatus to check the correctness of the received datum. Naturally, upon reception the signal has to be reconverted into the original (parallel) form in order to be utilized.

Digital signals to be transmitted, coded in a parallel mode and, generally, in NRZ (Non Return to Zero) format, must undergo a first coding of the 4B/5B type, which, by making a 5 bit block correspond with each 4 bit block, allows enlargement of the number of transitions of the transmitted signal. In particular, this coding guarantees the occurrence of at least one logic level transition for each 4 bits transmitted, avoiding the risk of a loss of synchronism of the receiving equipment by the presence in the signal of long stays at the same logic state. Moreover, the possible reception of one of the 16 not utilized 5-bit codes may be used for the detection of errors in the received signal.

After the 4B/5B coding, the parallel signal has to be converted into series mode and into the NRZI (Non Return to Zero Inverted) format, adopted internationally.

The NRZ/NRZI format converter causes the digital signal to be changed over between the two logic states, at the clock signal rate, when the NRZ signal remains at level one, whereas it causes it to stay at 0 or at 1 (depending on the last transition performed), when the NRZ signal is at logic state 0.

In reception, it is necessary to read correctly the received data, extracting from them the clock signal for the detection, and thus perform the inverse conversion and decoding operation, checking for the presence of any possible transmission errors.

The extraction of the clock signal is usually performed utilizing a PLL (Phase Locked Loop) circuit, which uses as a reference signal the same numerical signal arriving at the receiver and provides at the output side a clock signal at a frequency that is twice the bit rate. The arriving signal constitutes a good reference signal if it is rich in level transitions, so that its frequency spectrum has a precise component at the bit repetition frequency. This component is usually extracted by means of pass-band filters of the LC or SAW (Surface Acoustic Wave) type. These filters are rather bulky, they cannot be integrated with circuits on the same chip and they reduce the flexibility of the device, as they do not allow frequency excursion.

Another difficulty derives from electromagnetic compatibility problems due to the need to integrate on the same chip at least two PLL circuits, one in reception for the extraction of the clock signal and another one in transmission for the multiplication of the system clock signal for the serialization of the digital signal. Naturally on the same chip there may be more than one transceiver, and several PLL circuits, each with its own VCO (Voltage Controlled Oscillator), operating at radio frequency simultaneously with the others and thus being a source of electromagnetic radiation. Therefore it is necessary to adopt a precise topological strategy, at the design stage, concerning the placement of the circuits on the chip, in order to minimize disturbances and interference.

Finally, the device has to be able to operate at rather high bit rates, which currently are around 200 Mbit/s, maintaining at the same time reduced power consumption.

A transceiver that is able to carry out the aforementioned functions, called HOT-ROD, has been realized by Gazelle in GaAs technology, and can reach considerable bit rates, but is very expensive and inefficient. The ratio between the devices that are actually in operation and those produced is only about 20%, while for devices realized on silicon it reaches 80%.

A transceiver of this type may also be realized utilizing bipolar technology integrated circuits, such as those denominated SP9970 and SP9930 by GEC Plessey. The former integrated circuit contains a series-to-parallel converter, a parallel-to-series converter and a PLL that performs the multiplication by 10 of system frequency, whereas the latter one contains a PLL for the extraction of the clock signal and a NRZ/NRZI converter. Moreover, other circuits for the 4B/5B coding/decoding and the detection of errors are required.

With these circuits too the attainable bit rate is good, but the power consumption, typical of bipolar technology, is rather high.

Both examined solutions allow the extraction of the clock signal without the use of external filters, substituted by appropriate PLL circuits comprising a main loop (master) and a slaved one (slave), as described for example in the paper "A BiCMOS Receive/Transmit PLL Pair for Serial Data Communication", by Barry L. Thompson et al., presented at IEEE 1992 Custom Integrated Circuits Conference or in the paper "A Self Correcting Clock Recovery Circuit", by Charles R. Hogge, published in the Journal of Lightwave Technology, no. 6, December, 1985. The master loop recovers the fundamental frequency of the system starting from a reference frequency, while the slave loop brings about small phase corrections as a function of the received signal.

However, this type of PLL circuit presents some problems, as the two VCOs disturb each other, causing spurious locks.

SUMMARY OF THE INVENTION

These drawbacks are obviated by the CMOS, high-speed, digital signal transceiver, of the present invention, which is realized on a single CMOS technology integrated circuit, has low power consumption and high working speed, all inputs and outputs of which have a low voltage swing, and wherein the clock signal extraction circuit is able to self-align to data arriving with no spurious locks.

In particular, the device of the present invention is a transceiver for high speed digital signals in CMOS technology, comprising a transmitter, in which the incoming parallel flow is coded in a code having a higher number of transitions, converted into serial form and coded in the line code, and a receiver, in which the incoming serial flow is decoded from the line code, converted into parallel form and decoded in order to re-obtain the original parallel flow, the generation of the clock signal for the aforesaid decoding operations from the line code and conversion into parallel form being performed by a block, characterized in that it comprises a local oscillator, voltage controlled by two feedback loops, the first of which comprises:

a crystal oscillator;

a binary divider, which divides the signal provided by the local oscillator;

a phase-frequency detector, which operates on the signals provided by the binary divider and by the crystal oscillator, providing the outputs with signals at a suitable logic state, if the frequencies of the incoming signals are different, correction pulses at the appropriate instants, if the incoming signals have equal frequencies but are out of phase with respect to each other;

a first low-pass filter, which receives the signals provided by a phase-frequency detector and controls the local oscillator.

The second feedback loop comprises:

a phase detector, which operates on the signals provided by the local oscillator and on the incoming serial flow, providing at the output a third pulse reference signal and a fourth pulse signal, active for a time varying as a function of the phase error between the signals at its inputs; and a second low-pass filter, which receives the signals provided by the phase detector and controls the local oscillator.

BRIEF DESCRIPTION OF THE DRAWING

The above and other objects, features, and advantages will become more readily apparent from the following description, reference being made to the accompanying drawing in which.

SPECIFIC DESCRIPTION

Figure 1A:
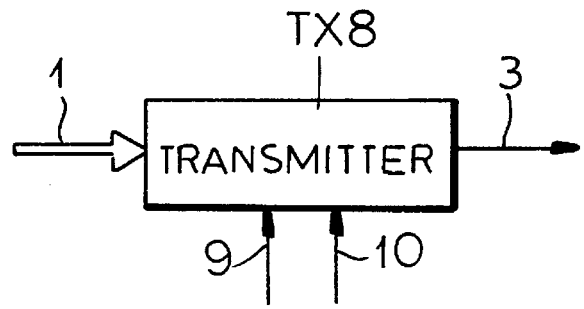
FIG. 1A to FIG. 1D are components of the digital signal transceiver.
Figure 1B:
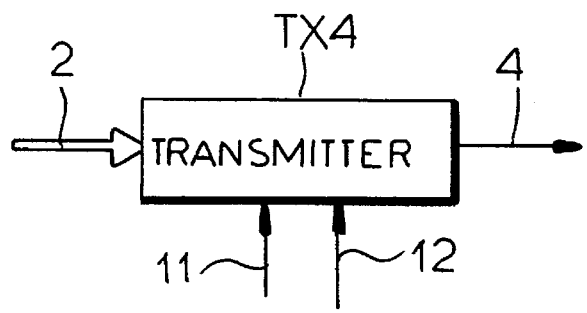
Figure 1C:
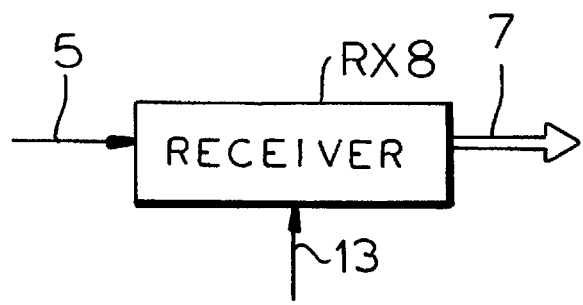
Figure 1D:
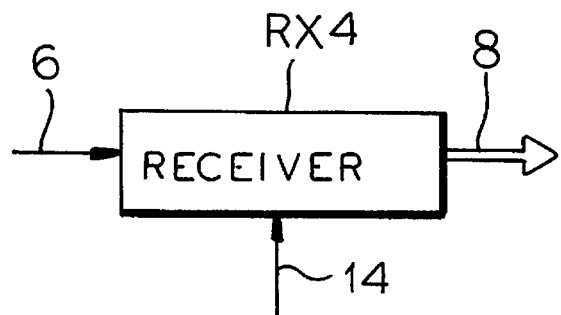

The digital signal transceiver formed by the circuits of FIGS. 1A to 1D comprises, on a single chip, an 8 receiver RX8 and transmitter TX8, as well as 4-bit receiver RX4 and transmitter TX4, electrically separated. Both transmitters convert the parallel data applied to inputs 1 and 2 into serial data, which they provide to outputs 3 and 4. The receivers perform the inverse operation, receiving serial data at inputs 5 and 6 and providing parallel data to outputs 7 and 8.

The transceiver is thus suitable for performing point-to-point interconnections, transferring on a single wire information coming from parallel connections at 4 and/or 8 bit. In the transmission phase, two subsequent coding are performed, i.e. the 4B/5B coding the NRZ to NRZI coding, in order to satisfy the specifications of international standard FDDI (ANSI), valid also for optical fiber transmission.

The transmitters have two control wires available, namely, reset wires 9 and 11 and wires 10 and 12, which allow the generation of a synchronism word, useful in defining a transmission protocol compatible with the current ATM (Asynchronous Transfer Mode) system. The receivers have one reset wire 13 or 14 available.

Figure 2:
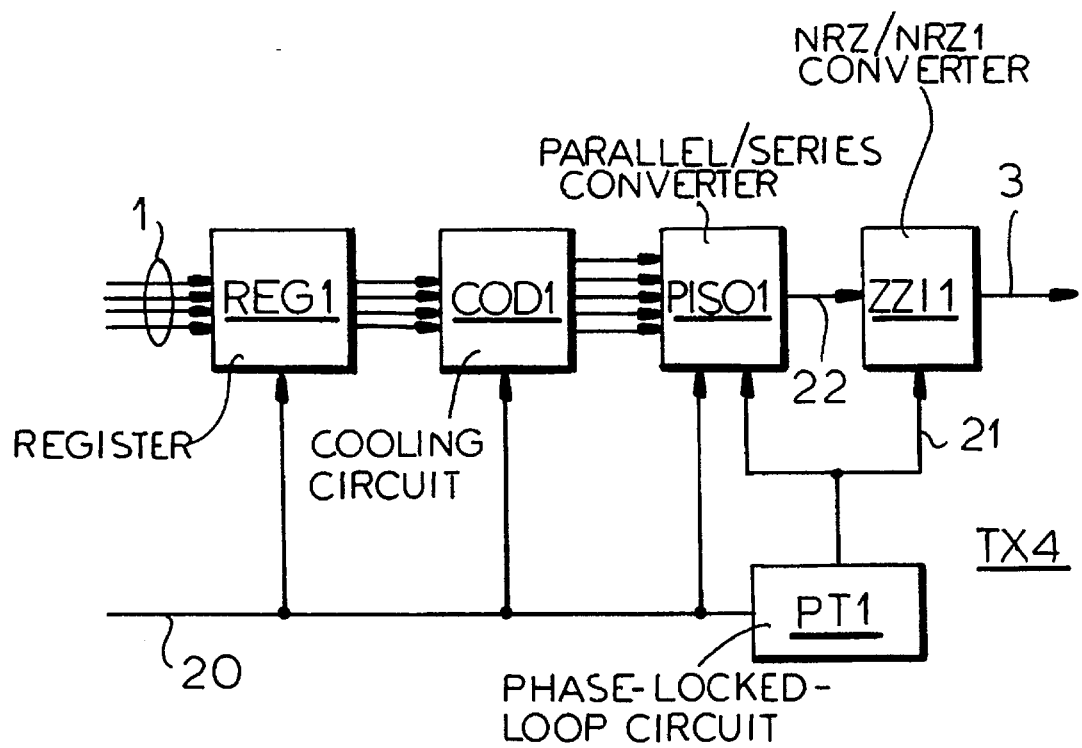
FIG. 2 is a block diagram of the transmitter denoted by TX4 in FIG. 1.

FIG. 2 shows the block diagram of 4-bit transmitter TX4. The block diagram of the 8-bit transmitter is entirely similar, so it shall not be described in detail, but rather the main differences shall be pointed out.

The 4-bit word incoming on connection 1 is supplied to a register REG1, which transfers them in synchronism with the system clock signal present on wire 20 to a coding circuit COD1, which performs the 4B/5B coding. The clock signal frequency is multiplied by 5 (it is instead multiplied by 10 in the 8-bit transmitter) by means of a PLL (Phase Locked Loop) circuit, indicated as PT1. Thus, on wire 21 a fast clock signal is obtained, which is brought with the slow clock signal to a parallel-to-series converter PIS01, which provides on output wire 22 a data flow of the NRZ type. The subsequent conversion from NRZ to NRZI is performed in block ZZI1, which provides as output on wire 3 a signal that may be sent over a suitable electrical transmissive means to the remote receiver. All blocks of the transmitter may be reset with a single command, sent by means of suitable wires, which are not shown.

Figure 3:
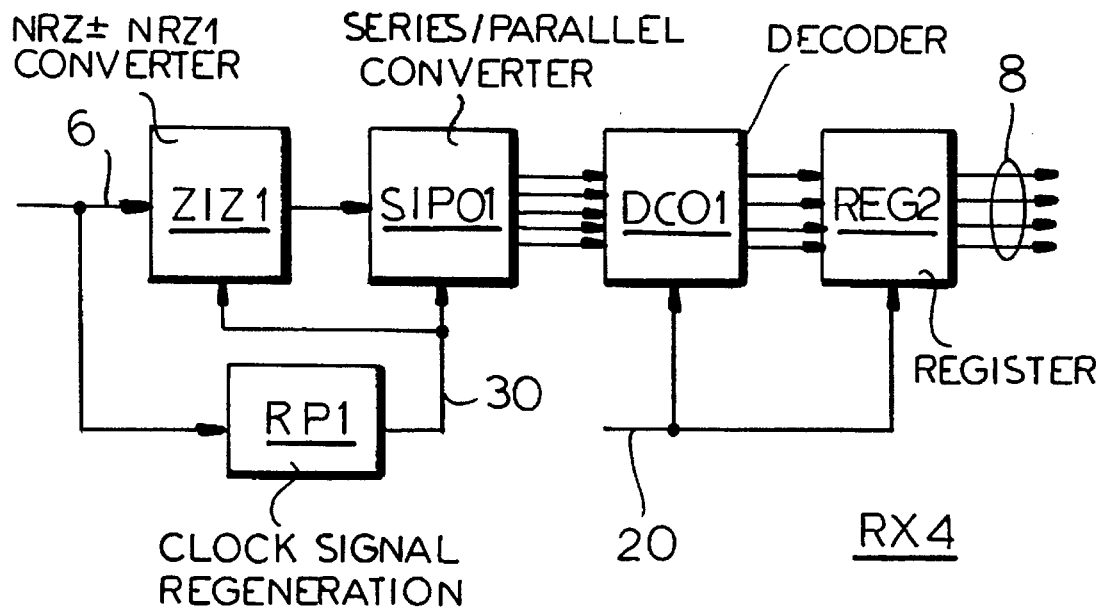
FIG. 3 is a block diagram of the receiver denoted by RX4 in FIG. 1.

In 4-bit receiver RX4, whose block diagram is illustrated in FIG. 3, operations inverse to the ones performed in the transmitter are carried out. In addition, the receiver recovers the fast clock signal from the flow of incoming data. This is the most critical operation in a high-speed data receiving system, because of the presence of more than one harmonic in the incoming signal, and thus of the possibility that a harmonic may be erroneously considered as a reference frequency. The circuit for the generation of the clock signal, adopted in the present receiver, uses a PLL circuit of innovative characteristics, which allows to avoid the use of band-pass filters tuned to the reference frequency.

The serial flow arrives from the transmission line to input 6 of the receiver and undergoes decoding from NRZI to NRZ in the ZIZ1 block. Simultaneously, it is also sent to the generation block of the clock signal PR1, which makes available in output on wire 30 the fast clock signal. This signal is sent together with the NRZ flow provided by block ZIZ1 to a series-to-parallel converter SIP01, which provides in output a parallel 5-bit flow. The subsequent 5B/4B decoding circuit DC01, controlled by the system clock signal present on wire 20, performs the second conversion from 5 bit to 4 bit. Thus, the parallel signal originally applied to the transmitter is re-obtained, and it is sent to an output register REG2, also controlled by the system clock signal on wire 20, and made available in output on connection 8.

Figure 4:
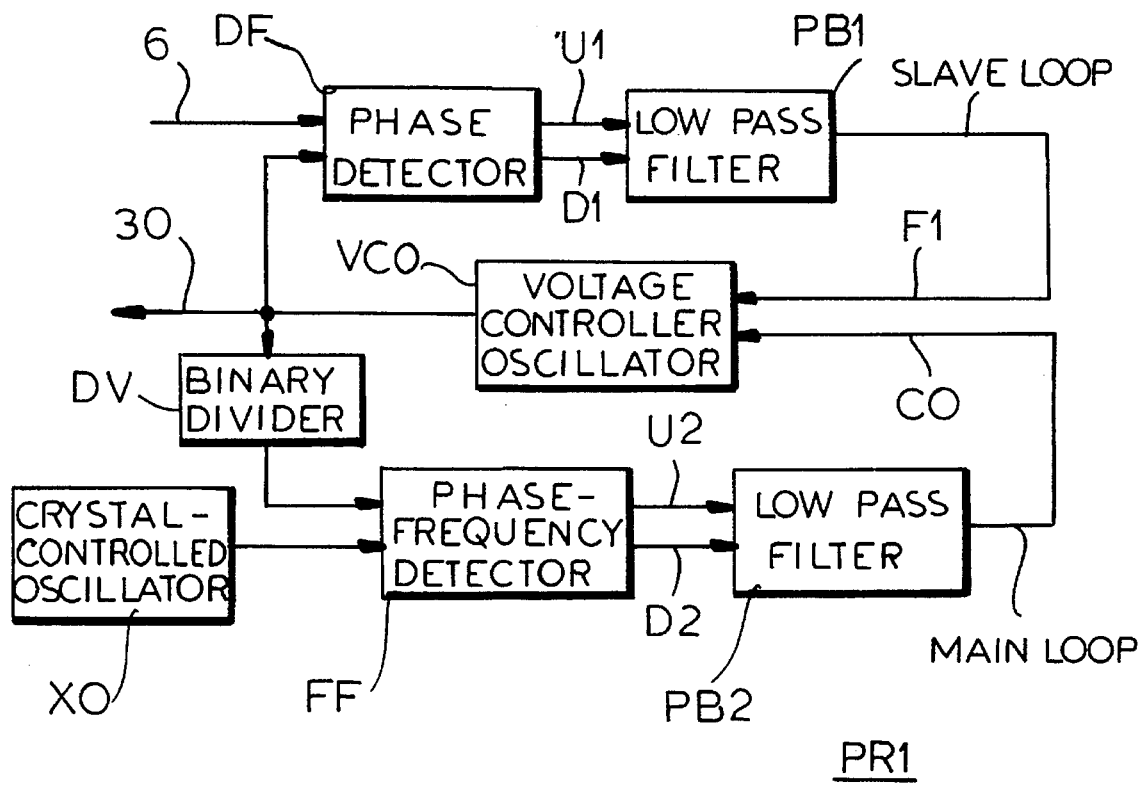
FIG. 4 is a block diagram of the clock signal generation block denoted by PR1 in FIG. 3.

The clock signal generation block PR1 is represented in FIG. 4. It is based on the PLL (Phase Locked Loop) circuit, which, as it is well known, synchronizes in phase and frequency the signal generated by a local oscillator to a reference signal. This is achieved by operating the comparison between the reference signal and the local oscillator signal, suitably divided, and utilizing the error signal obtained, deprived of the alternate current component, to control the local oscillator in feedback.

The block PR1 uses a particular PLL circuit, composed of a single voltage-controlled local oscillator, denoted by VCO, and of two feedback loops.

The main loop generates an error voltage of wide dynamics which it sends through wire CO to the VCO, determining its more important phase and frequency corrections. The slave loop generates a second error voltage of lower dynamics, which is sent on wire FI to a second input of the VCO, determining its accurate phase correction.

The reference signal for the main loop is generated by a crystal-controlled oscillator, denoted by XO, of a frequency equal to 1/10 of the frequency of the clock signal to recover. This signal is compared with the signal generated by the VCO, suitably divided by 10 by a binary divider DV, in a phase-frequency detector FF. The use of a phase-frequency detector is due to the fact that such detector does not allow lock conditions on frequencies that are harmonic to the desired one.

If the frequencies of the two signals are different, outputs U2 and D2 of detector FF, sensitive to the fronts of incoming signals and not to their duty cycle, stay blocked at an appropriate logic state. Low-pass filter PB2 placed in cascade emits, as a consequence, a continuous correction voltage that brings the frequency of the signal exiting binary divider DV to the same frequency of the reference signal exiting XO. In the iso-frequency condition thus reached, outputs U2 and D2 of detector FF behave as those of a normal phase detector providing correction pulses in the appropriate instants.

A low-pass filter PB2 has the task of providing at its output CO a dc voltage whose amplitude is the mean value of the pulses present at the outputs of the detector. It is a first-order low-pass filter, which has the peculiarity of containing within it, in integrated form, the resistance of RC network.

In such a way, a single connection toward the exterior is required to connect the capacitor. As this resistance must have a high stability, particular care must be devoted to dimensioning the transistors which embody it, making linear their resistive behaviour in the different operative points.

The slave loop comprises a phase detector DF, which compares the signal provided by VCO with the serial flow of data incoming on wire 6, providing the error pulses at its outputs U1 and D1. These pulses are sent to a low-pass filter PB1, realized in the same way as filter PB2, which makes available at its output FI the fine correction voltage for the voltage-controlled oscillator VCO. The recovered clock signal is thus available in output from voltage-controlled oscillator VCO on wire 30.

Figure 5:
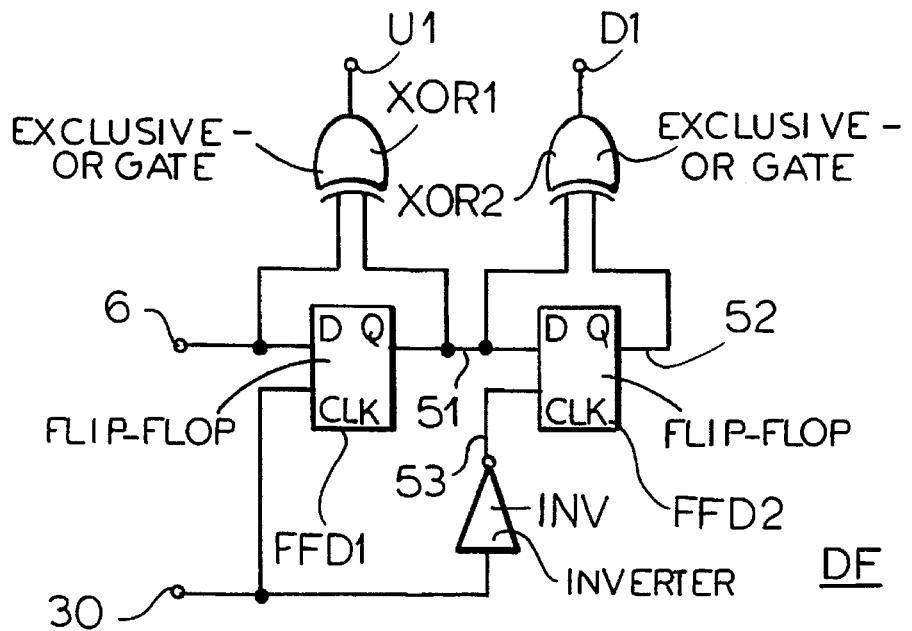
FIG. 5 is an electrical diagram of the phase detector denoted by DF in FIG. 4.

The electrical diagram of phase detector DF is shown in detail on FIG. 5. It is an original circuit, which allows to generate a correction voltage capable of keeping the signal provided by VCO on wire 30 centered on the data signal giving on wire 6.

The data signal is applied to input D1 of a D-type flip-flop, denoted by FFD1, which, receiving the clock signal at the input CLK, re-synchronizes it and makes it available at the output on wire 51. A second D-type flip-flop, denoted by FFD2, receives the datum perfectly synchronized with the system clock signal, and, having as a reference the clock signal inverted by inverter INV, transfers it to the output on wire 52, delayed by half a cycle.

At output D1 of Exclusive-OR circuit XOR2, which receives at its inputs the input and output signals of FFD2, there is for each transition of the incoming datum a constant-duration pulse, equal to half the clock period.

Such pulse serves as a reference. If the datum coming into the detector were already perfectly aligned with the clock signal, then at output U1 of Exclusive-OR circuit XOR1, which receives at its inputs the input and output signals of FFD1, there would be a signal having the same form as the one on D1, but leading by a half period.

If, instead, the incoming datum were not perfectly aligned, but, for instance, in phase lead, then the signal at output U1 would not vary, while the signal at the D1 output would remain active for a longer time. These signals would cause low-pass filter PB1 to supply at its output a voltage whose mean value varies proportionally to the phase difference, thus producing a decrease of the frequency of the clock signal generated by the voltage-controlled oscillator VCO (FIG. 4).

Analogously, if the incoming datum were lagging, then the signal at output U1 would remain identical, while the signal at output D1 would remain active for a shorter time producing an increase in clock signal frequency.

Figure 6:
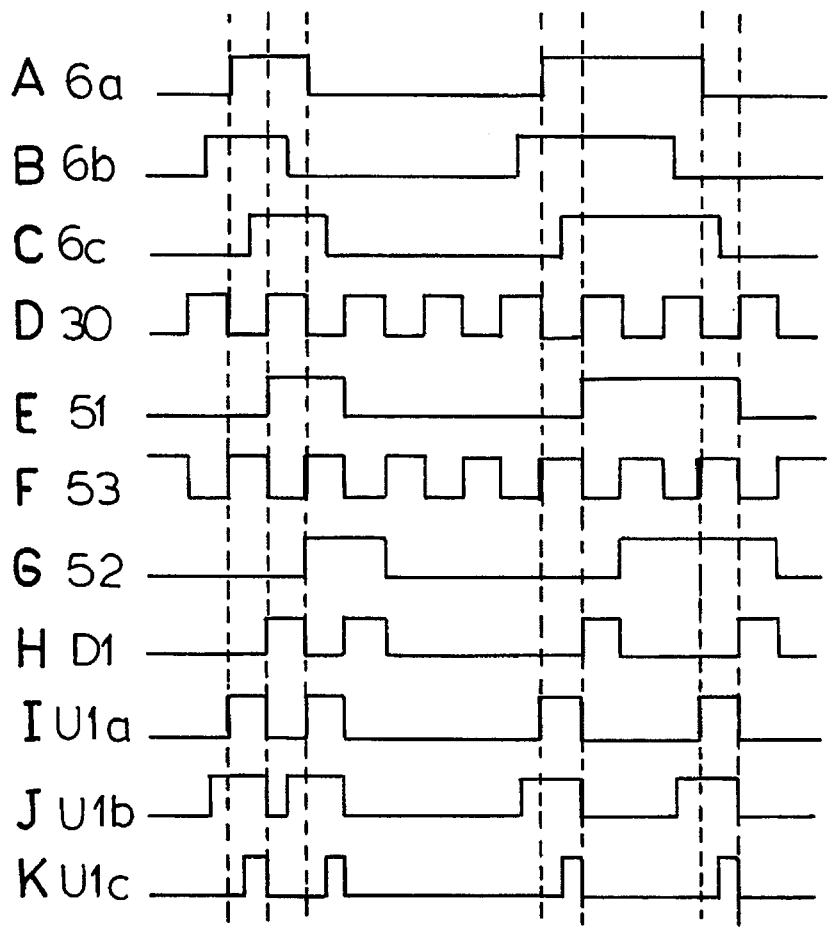
FIG. 6 is a time diagram in which the main waveforms of phase detector DF of FIG. 5 are represented.

FIG. 6 is a time diagram where the main waveforms A–K of phase detector DF are represented. Each waveform is denoted by the number assigned to the wire where it is present. Waveforms 6a, 6b, 6c and U1a, U1b, U1c have to do with the signals present on wires 6 and U1 in the respective conditions of datum aligned with the clock signal, leading datum and lagging datum.

Figure 7:
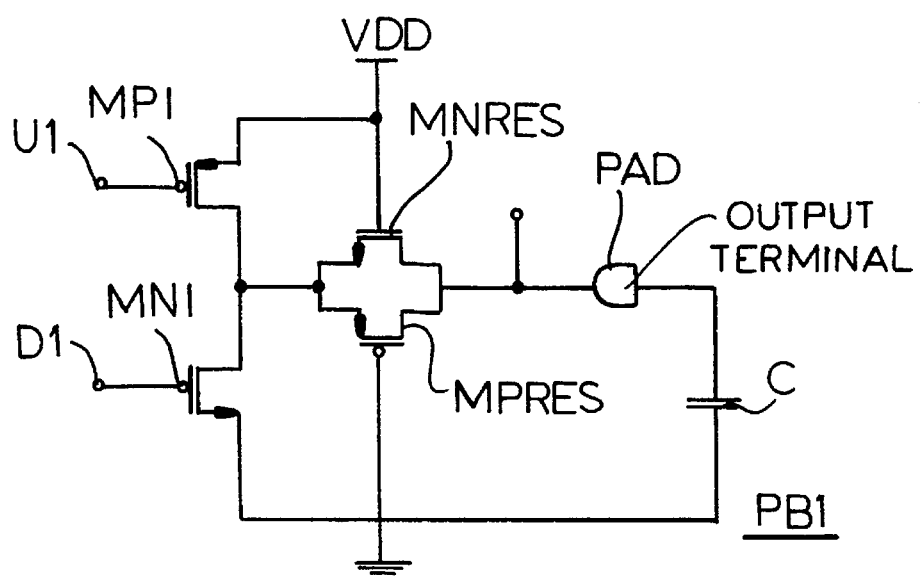
FIG. 7 is a circuit diagram of a low-pass filter denoted by PB1 in FIG. 4.

FIG. 7 represents the circuit diagram of one of the two low-pass filters utilized in the clock signal generation block, in particular filter PB1.

Pulse signals exiting the detector are applied to the two inputs D1 and U1, connected respectively to the gates of the two MOS transistors MNI and MPI, having the drains connected to each other and the sources connected to ground and to power supply source VDD.

These two N and P channel transistors operate as current sources for a couple of MOS transistors, N channel transistor MNRES and P channel transistor MPRES which realize resistance R of the RC network of the 1st order low-pass filter. The particular type of circuit allows to attain a compensation of the non-linearities of the MOS transistors and a behavior that is independent of the current direction.

Transistors MNRES and MPRES have their sources connected to each other and to the drains of the pair MNI, MPI and the gates connected to ground and to VDD. The drains are connected to wire FI which goes to the control input of the voltage-controlled oscillator VCO (FIG. 4) and to output terminal PAD of the integrated circuit, to which capacitor C, which determines the cutoff frequency of the filter, may be externally connected.

When on wire U1 there is a logic level 0, transistor MPI is driven into conduction, supplying current to transistors MNRES and MPRES, which charge the external capacitor C. A similar logic level applied to wire D1 would keep off transistor MNI, thus preventing its driving of the pair MNRES, MPRES.

On the contrary, the presence of a logic level 1 on wire D1 drives into conduction transistor MNI, so that the pair of transistors MNRES, MPRES may discharge to ground the external capacitor C.

On wire FI, connected to terminal PAD, there is thus a voltage that follows the mean value of the pulse signal provided by the detector, suitable for driving the voltage-controlled oscillator VCO (FIG. 4).

It is evident that what has been described above was provided solely as a non-limiting example. Variations and modifications are possible without going out of the field of protection of the claims.

We claim:

1. A high speed digital signal transceiver in CMOS technology comprising:

a transmitter in which an incoming parallel flow is coded in a code having a high number of transitions, converted into serial form and coded in a line code, and a receiver in which an incoming serial flow is decoded from a line code, converted into parallel form and decoded in order to re-obtain an original parallel flow, said transceiver having a unit for generating a clock signal for the decoding from line code and conversion into parallel form, said unit comprising:

a voltage-controller local oscillator controlled by two feedback loops, a first of said loops comprising:

a crystal oscillator;

a binary divider which divides a signal provided by the local oscillator;

a phase-frequency detector which operates on signals provided by the binary divider and by the crystal oscillator, providing outputs with signals at a certain logic state if the frequencies of the incoming signals are different, and correction pulses at respective instants if the incoming signals have equal frequencies but are out of phase with respect to each other; and a first low-pass filter, which receives the signals provided by the phase-frequency detector and controls the local oscillator;

the second reaction loop comprising:

a phase detector, which operates on signals provided by the local oscillator and on an incoming serial flow, providing at an output of said phase detector a third pulse reference signal and a fourth pulse signal active for a time varying as a function of a phase error between signals at inputs of the phase detector; and a second low-pass filter which receives the signals provided by the phase detector and controls the local oscillator, said phase detector comprising:

a first D-type flip-flop having a data input receiving the incoming serial flow and a clock input receiving a signal provided by the local oscillator;

a second D-type flip-flop having a data input receiving an output signal from the first flip-flop and a clock input is receiving the signal provided by the local oscillator inverted by an inverter; and two exclusive-OR gates each with inputs connected to the data input and to the output of one of said flip-flops and with outputs connected to outputs of the phase detector.

2. A high speed digital signal transceiver in CMOS technology comprising:

a transmitter in which an incoming parallel flow is coded in a code having a high number of transitions, converted into serial form and coded in a line code, and a receiver in which an incoming serial flow is decoded from a line code, converted into parallel form (SIP01) and decoded in order to re-obtain an original parallel flow, said transceiver having a unit for generating a clock signal for the decoding from line code and conversion into parallel form, said unit comprising:

a voltage-controller local oscillator controlled by two feedback loops, a first of said loops comprising:

a crystal oscillator;

a binary divider which divides a signal provided by the local oscillator;

a phase-frequency detector which operates on signals provided by the binary divider and by the crystal oscillator, providing outputs with signals at a certain logic state, if the frequencies of the incoming signals are different, and correction pulses at respective instants, if the incoming signals have equal frequencies but are out of phase with respect to each other; and a first low-pass filter, which receives the signals provided by the phase-frequency detector and controls the local oscillator;

the second reaction loop comprising:

a phase detector, which operates on signals provided by the local oscillator and on an incoming serial flow, providing at an output of said phase detector a third pulse reference signal and a fourth pulse signal active for a time varying as a function of a phase error between signals at inputs of the phase detector; and a second low-pass filter which receives the signals provided by the phase detector and controls the local oscillator, each of said low-pass filters comprising:

a first pair of complementary MOS transistors whose gates are connected to outputs of the respective phase detectors, whose drains are connected to each other and whose sources are connected to ground and to a power supply; and a second pair of complementary MOS transistors, whose gates are connected to ground and to the power supply, whose sources are connected to each other and to the drains of the first pair and whose drains are connected to each other and to an output, to which is also connected an external capacitor which determines a cutoff frequency.

\* \* \* \* \*